(12) United States Patent
Plachetka

(10) Patent No.: US 9,486,923 B2
(45) Date of Patent: Nov. 8, 2016

(54) FLOOR TREATMENT ROBOT WITH PERSONAL WEIGHING SCALE

(71) Applicant: Vorwerk & Co. Interholding GmbH, Wuppertal (DE)

(72) Inventor: Robert Plachetka, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 14/877,337

(22) Filed: Oct. 7, 2015

(65) Prior Publication Data
US 2016/0101525 A1 Apr. 14, 2016

(30) Foreign Application Priority Data

Oct. 8, 2014 (DE) .................. 10 2014 114 611

(51) Int. Cl.
| | | |
|---|---|---|
| *A47L 7/00* | (2006.01) | |
| *B25J 11/00* | (2006.01) | |
| *A47L 5/00* | (2006.01) | |
| *G01G 19/56* | (2006.01) | |
| *A47L 5/22* | (2006.01) | |
| *A47L 9/00* | (2006.01) | |
| *A47L 9/28* | (2006.01) | |
| *A47L 11/24* | (2006.01) | |
| *A47L 11/40* | (2006.01) | |
| *B25J 5/00* | (2006.01) | |
| *B25J 5/06* | (2006.01) | |
| *G01G 19/44* | (2006.01) | |
| *G01G 19/52* | (2006.01) | |

(52) U.S. Cl.
CPC .............. *B25J 11/0085* (2013.01); *A47L 5/00* (2013.01); *A47L 5/22* (2013.01); *A47L 7/0085* (2013.01); *A47L 9/009* (2013.01); *A47L 9/2873* (2013.01); *A47L 11/24* (2013.01); *A47L 11/4005* (2013.01); *A47L 11/4011* (2013.01); *A47L 11/4066* (2013.01); *B25J 5/007* (2013.01); *B25J 5/06* (2013.01); *G01G 19/44* (2013.01); *G01G 19/52* (2013.01); *G01G 19/56* (2013.01); *A47L 2201/022* (2013.01); *A47L 2201/04* (2013.01); *Y10S 901/01* (2013.01)

(58) Field of Classification Search
CPC .............. A47L 2201/022; A47L 2201/04; A47L 7/0085; A47L 9/2873; A47L 9/009; A47L 5/00; A47L 5/22; A47L 11/4011; A47L 11/4066; A47L 11/24; A47L 11/4005; B25J 11/0085; B25J 5/06; B25J 5/007; G01G 19/52; G01G 19/44; G01G 19/56
USPC ...................................................... 15/319, 339
IPC ....................................................... A47L 7/00
See application file for complete search history.

(56) References Cited

U.S. PATENT DOCUMENTS

| | | | |
|---|---|---|---|
| 5,995,884 A | 11/1999 | Allen et al. | |
| 6,472,617 B1 | 10/2002 | Montagnino | |
| 6,891,113 B2 | 5/2005 | Fringeli et al. | |
| 2014/0289992 A1 | 10/2014 | Ziegler et al. | |

FOREIGN PATENT DOCUMENTS

| | | |
|---|---|---|
| DE | 10115788 A1 | 10/2002 |
| EP | 0285689 A1 | 10/1988 |
| EP | 2617340 A2 | 7/2013 |
| JP | 2005195513 A | 7/2005 |
| JP | 2008056192 A | 3/2008 |
| JP | 2008093698 A | 4/2008 |
| WO | 2012002496 A1 | 1/2012 |

*Primary Examiner* — David Redding
(74) *Attorney, Agent, or Firm* — The Webb Law Firm

(57) ABSTRACT

The invention relates to a floor treatment robot having an autonomously movable floor treatment appliance and having a housing. The housing of the floor treatment appliance has a standing area on the top side for supporting a person. At least one load cell is provided. The load cell is suitable for measuring the weight of the person. This floor treatment robot solves the technical problem of reducing the space requirement for different domestic appliances.

8 Claims, 2 Drawing Sheets

FLOOR TREATMENT ROBOT WITH PERSONAL WEIGHING SCALE

CROSS-REFERENCE TO RELATED APPLICATION

This application claims priority to German Patent Application No. 10 2014 114 611.5 filed Oct. 8, 2014, the disclosure of which is hereby incorporated in its entirety by reference.

BACKGROUND OF THE INVENTION

1. Field of the Invention

The invention relates to a floor treatment robot having an autonomously movable floor treatment appliance, which has a housing. If necessary, a base station is provided, which serves at least to charge the battery of the floor treatment appliance.

2. Description of Related Art

Within the context of the present invention, a floor treatment appliance means a suction and/or sweeping appliance. To this end, such cleaning appliances have electrically driven suction fan units and/or brushes and/or brush rollers that are driven by electric motors. A floor treatment appliance can also mean a lawn mower. However, the invention is described mainly in relation to a floor-cleaning appliance in the domestic field below.

The autonomously movable floor treatment robot is supplied with electricity by means of batteries. To charge the batteries and also where necessary to dispose of the dirt or waste collected in a container inside the appliance, the floor treatment appliance is assigned a stationary base station, which is connected to the domestic electricity supply system.

The known floor treatment appliance finds the base station autonomously, e.g. using a radio and/or light signal guide or else radio communication between base station and floor treatment appliance. The prompt to move to the base station can take place automatically, e.g. by radio communication between base station and floor treatment appliance. The floor treatment appliance can likewise move to the base station by itself depending on the fill level of the dirt container of the appliance and/or on the charge state of the batteries. Furthermore, the floor treatment appliance can move to the base station automatically after completing a task to be carried out, e.g. cleaning a predefined floor area.

In the rest state, the self-propelled floor treatment appliance is situated at or on the base station and thus occupies a certain area in the room that cannot be used for other appliances or objects. Therefore, the base station is often stored in rooms such as bathrooms or storage rooms, so that the floor treatment appliance causes less of an obstruction.

A further domestic appliance is a personal weighing scale, which is likewise typically stored in bathrooms or storage rooms. The two appliances are often arranged directly next to each other.

The present invention is therefore based on the technical problem of reducing the space requirement for different domestic appliances.

SUMMARY OF THE INVENTION

Said technical problem is solved according to the invention by a floor treatment robot as mentioned in the introduction in that the housing of the floor treatment appliance has a standing area on the top side for supporting a person, that at least one load cell is provided, and that the load cell is suitable for measuring the weight of the person. To this end, the housing of the floor treatment appliance is preferably suitable for a load of at least 100 kg.

Two fundamentally different appliances, which have no common properties per se, are thus combined with each other in a surprising manner. A user of a floor treatment robot, in particular a floor-cleaning robot, can simultaneously use this appliance for measuring body weight. Body weight can then be measured independently of the location of the floor treatment appliance if the weighing function is integrated exclusively in the floor treatment appliance. Of course, the floor treatment appliance can also be used for measuring body weight if the floor treatment appliance is situated in or at the base station. If the weighing function is integrated in the base station, the floor treatment appliance must be situated on the base station.

The invention is described first in the preferred embodiment, in which the weighing function is integrated solely in the floor treatment appliance. To this end, in a preferable manner at least three support points of the floor treatment appliance each have a load cell. The three support points can for example be two drive wheels and one freely running castor. If a person stands on the floor treatment appliance, the three support points define a standing area and the person can stand safely on the floor treatment appliance.

If more than three support points are present, that is for example two drive wheels and at least two freely running castors, then in a further preferred manner all the support points of the floor treatment appliance have a load cell. This ensures that the entire weight of the person is measured.

In a further advantageous manner, the bearing points of the drive wheels and of the freely running castors act as effective points of the load cells. The load cells can thus be integrated easily into the floor treatment appliance.

An alternative configuration of the present invention consists in that a base station as mentioned in the introduction at least for charging the battery of the floor treatment appliance provides the weighing function together with the floor treatment appliance.

To this end, it is preferred for the base station to have a base plate for receiving all the support points of the floor treatment appliance and for the at least one load cell to be connected to the base plate. Then, whenever the floor treatment appliance has moved to the base station and is in the rest position and where applicable charging position, the floor treatment robot can be used as a personal weighing scale.

To determine the body weight of a person standing on the floor treatment appliance, an evaluation unit for evaluating the measurement signals of the at least one load cell is provided, which measures the current dead weight of the floor treatment appliance before the weight of a person standing on it is measured. The dead weight is then subtracted during the subsequent evaluation of the measurement signals of the load cells.

The measured weight of the person is then displayed on a display in the floor treatment appliance or in the base station.

As in known personal weighing scales, further sensors for determining further body properties can also be integrated in the standing area, for example electrodes for measuring a current conducted through the body to determine the fat content of the tissue.

BRIEF DESCRIPTION OF THE DRAWINGS

The invention is explained in more detail below using exemplary embodiments with reference to the attached drawing. In the drawing.

DETAILED DESCRIPTION OF THE INVENTION

Figure 1:
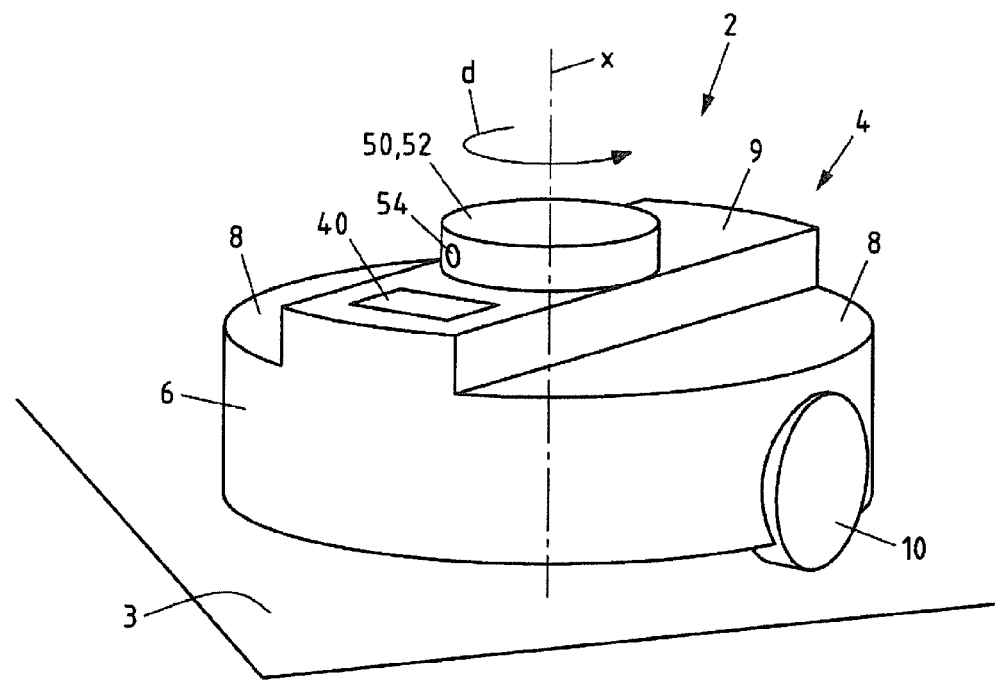
FIG. 1 shows a perspective diagram of a floor treatment appliance of a floor treatment robot having a standing area for a person.
Figure 2:
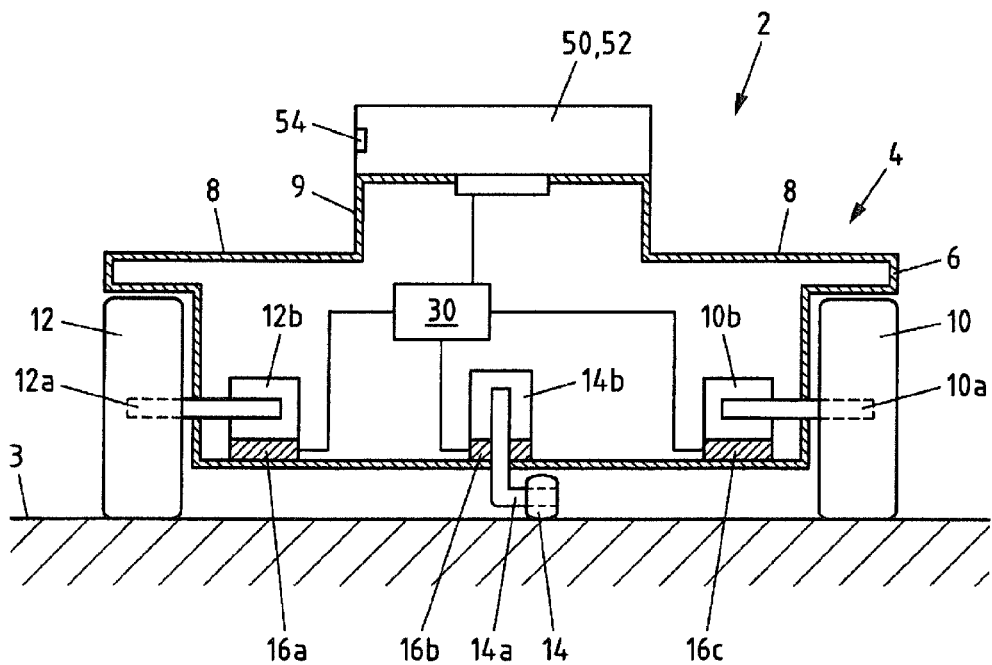
FIG. 2 shows a cross section of a floor treatment appliance of a floor treatment robot having load cells integrated in the housing.

FIGS. 1 and 2 show a floor treatment robot 2 according to the invention having a floor treatment appliance 4 that can move autonomously on a subsurface 3. The housing 6 of the floor treatment appliance 4 has a standing area 8 on the top side for supporting a person, which consists of two partial surfaces each arranged adjacently to a central section 9. To this end, the housing 6 of the floor treatment appliance 4 is suitable for a load of at least 100 kg.

Figure 3:
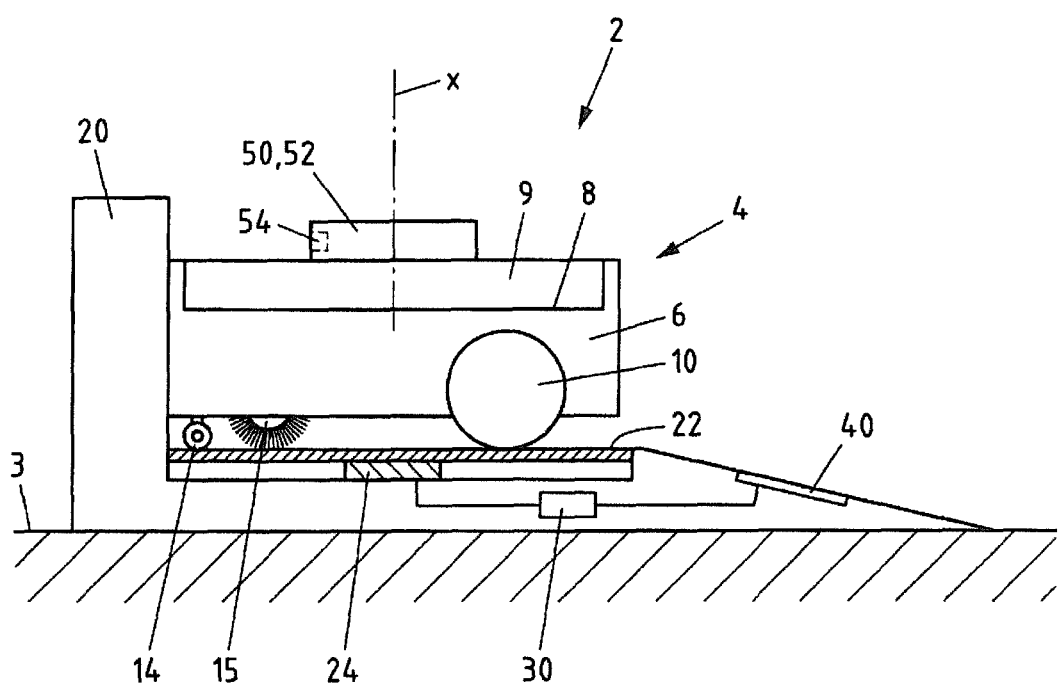
FIG. 3 shows a cross section of a floor treatment appliance of a floor treatment robot having a base station with an integrated load cell.

Furthermore, two drive wheels 10 and 12 and a supporting wheel 14 are provided, only one drive wheel 10 being visible in FIG. 1 owing to the perspective representation. In FIG. 3, a brush roller 15 can also be seen, which improves the suction process by whirling particles up from the floor 3.

As can be seen in FIG. 2, the three wheels 10, 12 and 14 each have an axle 10a, 12a and 14a, which are mounted in bearings 10b, 12b and 14b. The bearings 10b, 12b and 14b are connected fixedly to the housing 6 and have load cells 16a, 16b and 16c, which are not shown in detail. The load cells 16a, 16b and 16c are suitable for measuring the weight of a person standing on them.

FIG. 3 shows a further exemplary embodiment of a floor treatment robot 2 according to the invention having a floor treatment appliance 4, which corresponds substantially to the basic structure of the floor treatment appliance 4 shown in FIG. 1. In addition, a base station 20 is provided, which serves at least to charge the battery of the floor treatment appliance 4. The base station 20 has a base plate 22 for receiving all the support points, that is, the wheels 10, 12 and 14 of the floor treatment appliance 4. The base plate 22 is connected to at least one load cell 24. Instead of only one load cell 24, more than one load cell 24 can also be provided.

As shown in FIG. 2 and in FIG. 3, an evaluation unit 30 is provided for evaluating the measurement signals of the at least one load cell 16a, 16b and 16c and/or 24. The evaluation unit 30 measures the current dead weight of the floor treatment appliance 4 before the weight of a person standing on it is measured, which can be realized by a suitable start process. At least the measured weight is then displayed on a display 40 arranged in the floor treatment appliance 4 or in the base station 20.

The floor treatment appliance 4 shown also has an attachment 50 with a sensor system 52 for detecting the spatial structure around the floor treatment appliance. To this end, a laser sensor 54 is preferably provided, which scans the surroundings of the floor treatment appliance. To this end, the attachment 50 can be rotated about a vertical axis x, as is indicated in FIG. 1 with the arrow d.

The invention claimed is:

1. A floor treatment robot comprising:
   an autonomously movable floor treatment appliance and a housing, wherein
   the housing of the floor treatment appliance comprises a standing area on a top side configured to support a person,
   at least one load cell is provided, and
   the load cell is configured to measure a weight of the person.

2. The floor treatment robot according to claim 1, wherein the housing of the floor treatment appliance is suitable for a load of at least 100 kg.

3. The floor treatment robot according to claim 1, wherein at least three support points of the floor treatment appliance each have a load cell.

4. The floor treatment robot according to claim 3, wherein bearing points of drive wheels and, where applicable, of freely running castors act as effective points of the load cells.

5. The floor treatment robot according to claim 1, wherein a base station is provided at least for charging a battery of the floor treatment appliance, and
   the base station comprises a base plate configured to receive all support points of the floor treatment appliance, and
   the at least one load cell is connected to the base plate.

6. The floor treatment robot according to claim 1, wherein an evaluation unit is configured to evaluate measurement signals of the at least one load cell.

7. The floor treatment robot according to claim 6, wherein the evaluation unit measures current dead weight of the floor treatment appliance before the weight of a person standing on it is measured.

8. The floor treatment robot according to claim 6, wherein a display is arranged in the floor treatment appliance or in a base station.

* * * * *